UNITED STATES PATENT OFFICE 2,574,619

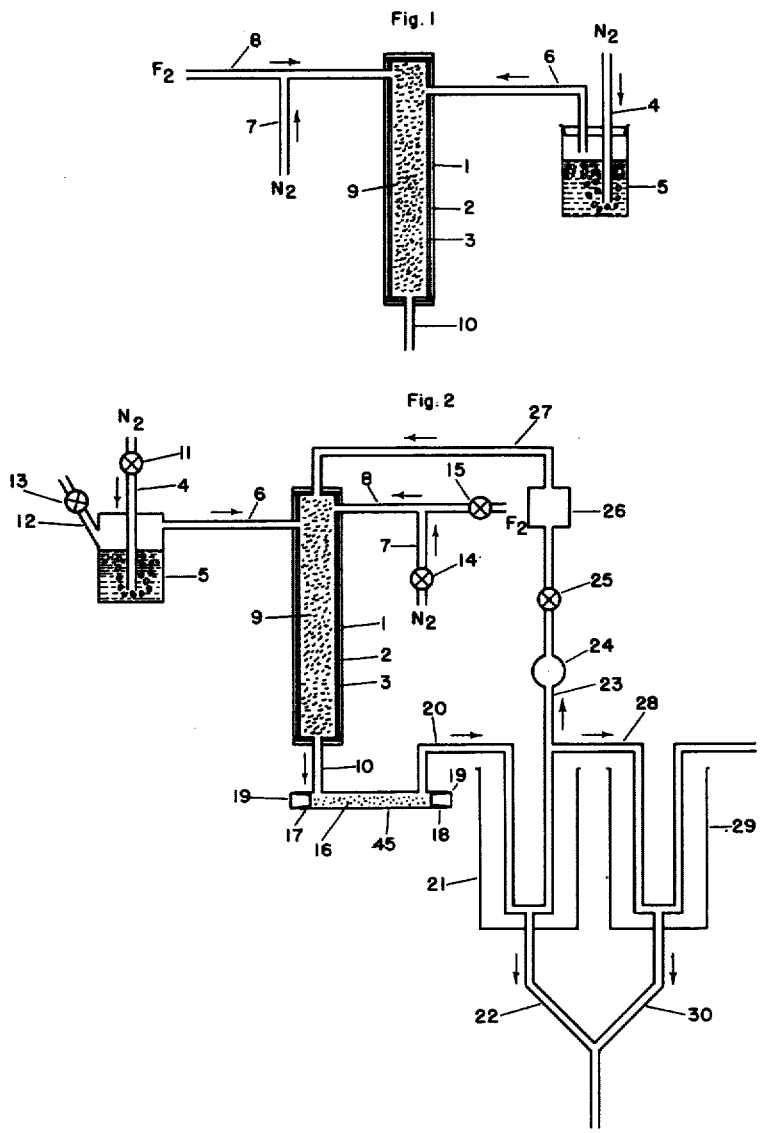

PROCESS FOR THE PREPARATION OF FLUOROCARBONS

George H. Cady, Leonia, N. J., assignor to the United States of America as represented by the United States Atomic Energy Commission Application March 9, 1943, Serial No. 478,567

7 Claims. (Cl. 260—648)

This invention relates to the preparation of fluorocarbons, and more particularly to the fluorination of pure or mixed hydrocarbon compounds or partially fluorinated hydrocarbons containing more than two carbon atoms per molecule, by a catalytic vapor phase reaction with elementary fluorine.

Heretofore, some fluorocarbons containing more than two carbon atoms have been produced but in such small amounts that the process for making them was not practically useful.

The essence of the present invention is the efficient conversion of a pure or mixed hydrocarbon containing more than two atoms per molecule, into a corresponding completely fluorinated fluorocarbon or a mixture of fluorocarbons in good yield. The value of the fluorocarbons rests in their high stability toward heat and oxidizing agents which attack ordinary organic liquids.

Their thermal stability is evidenced by the fact that they can be heated to 400° C. to 500° C. even in the presence of catalytic materials. The fluorocarbons of this invention are not attacked by nitric acid, sulfuric acid, acid chromate and permanganate solutions, and are of particular importance because of their stability in the presence of uranium hexafluoride even at temperatures above 150° C.

They may thus be used as lubricants, waxes, greases, sealing liquids or gases for handling highly corrosive materials and for any other applications where an inert solid, liquid or gas is required. Certain of the fluorocarbons are also excellent refrigerants.

Fig. 1 is a semi-diagrammatic view in sectional elevation of an apparatus for carrying out the process in a semi-continuous manner.

Fig. 2 represents a similar view of an apparatus for a continuous process for effecting the reaction.

The process consists essentially of the passage of fluorine and hydrocarbon vapor over a catalyst held within a reaction vessel maintained at a suitable and predetermined temperature. The gases should enter the vessel through separate inlets at known and uniform rates, and should be allowed to mix in the presence of the catalyst. It is preferable, though not necessary for the success of the process, that an inert gaseous diluent be added to retard the reaction and that a small excess of fluorine be passed through the reaction vessel so that unreacted fluorine passes from the reaction vessel at the outlet.

The diluent and hydrocarbon vapor mixture may be obtained by passing the diluent through a liquid hydrocarbon, for example benzene, held at substantially constant temperature. It is to be noted that the fluorine and the diluted hydrocarbon are not mixed before being passed over the catalyst. The catalyst may be one of those described in my U. S. Patent No. 2,510,864. As disclosed therein, those catalysts comprise a heat conducting metal base having thereon an adherent layer of a metal fluoride selected from the group of the fluorides of silver, cobalt, manganese and cerium. The catalyst should have as large a surface area as can be conveniently employed in the reaction chamber. The diluents may be nitrogen, argon, helium, hydrogen fluoride, one or more of the fluorocarbons, or some other gas which does not interfere with the reaction. The hydrocarbon, as stated before, may be pure or mixed or partially fluorinated containing more than two carbon atoms per molecule.

The temperature of the reaction and of the catalyst are prime factors in the process and must be kept high enough to prevent the formation of a substantial amount of a tar or a resinous product as the fluorine reacts with the organic material; and at the same time the temperature should be low enough to prevent extensive breaking down of the chains and/or rings of carbon atoms in the organic substance being treated. In other words, there is a certain temperature range for each catalyst and for each type of reaction which is best suited for the efficient production of the desired fluorocarbon. It has been found that this best temperature is in each case considerably higher than would be expected.

For instance, the reaction of benzene and fluorine occurs rapidly at temperatures even lower than −80° C. and one would probably seek to retard the reaction by lowering the temperature further. However, by using certain catalysts including those disclosed in my patent hereinbefore referred to, instead of lowering the temperature, the optimum temperature employed is actually raised, e. g., to 100° C. and in some instances to 400° C. or above.

Referring to Fig. 1, numeral 1 denotes a reaction vessel for the production of fluorocarbons by the reaction of gaseous fluorine and a hydrocarbon vapor such as benzene in the presence of nitrogen gas, assisted by a heated, highly thermally conductive catalytic agent which at the maintained temperature causes fluorination of the benzene. The reaction vessel may be constructed in many different ways, but must be capable of operation at the maintained temperatures. The particular vessel shown has an internal copper wall 2 with a silver plating 3.

The mixture of benzene and nitrogen obtained by passing nitrogen gas from pipe 4 through liquid benzene maintained at a substantially constant temperature in chamber 5 enters the reaction vessel by pipe 6. Nitrogen from pipe 7 mixes with fluorine in pipe 8 before they enter the reaction chamber 1. The flow of the gaseous mixtures is continuous and at a uniform rate. The heated catalysts 9, say of silver plated copper turnings, are maintained at approximately uniform temperature. At first the fluorine reacts with the silver to form silver fluoride but after a time the silver absorbs no more gas. The flow of hydrocarbon is then started and fluorocarbons and hydrogen fluoride pass from the bottom of the vessel by pipe 10 and the products are later separated. The reaction chamber is electrically or otherwise heated, by means not shown, so that the temperature is maintained at the optimum operating range for the particular catalyst and gas velocity. The direction of flow is shown by the arrows.

Each of the following reactions has been used to produce the indicated fluorocarbon in yields exceeding 50% of the theoretical value.

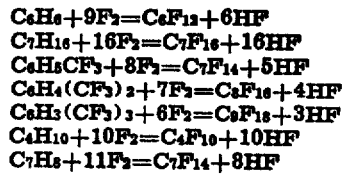

$$C_6H_6 + 9F_2 = C_6F_{12} + 6HF$$
$$C_7H_{16} + 16F_2 = C_7F_{16} + 16HF$$
$$C_6H_5CF_3 + 8F_2 = C_7F_{14} + 5HF$$
$$C_6H_4(CF_3)_2 + 7F_2 = C_8F_{16} + 4HF$$
$$C_6H_3(CF_3)_3 + 6F_2 = C_9F_{18} + 3HF$$
$$C_4H_{10} + 10F_2 = C_4F_{10} + 10HF$$
$$C_7H_8 + 11F_2 = C_7F_{14} + 8HF$$

Biphenyl, cetane, chrysene, retene, anthracene, diamyl naphthalene and several other hydrocarbons including mixtures such as impure heptane, gas oil and lubricating oil have been successfully fluorinated to give completely fluorinated products.

For example, waxes are principally produced by the fluorination of biphenyl, cetane, anthracene, n-dodecane, or of some paraffinic petroleum oils; and liquids and oils are principally produced by the fluorination of chrysene, retene, diamyl naphthalene, polyisobutylene and most petroleum oils. The oils obtained may be separated into a variety of products of different viscosities and boiling points. They are thermally and chemically stable and some of them are good lubricants and oils.

The fluorocarbons may be purified by washing, agitating in a solution of sodium hydroxide or by any of a number of chemical methods, after which the fluorocarbon may be drained off from the bottom of the vessel and dried. If a particular fluorocarbon is to be separated from a fluorocarbon mixture, it may be separated by fractional distillation.

An illustrative preparation of $C_6F_{12}$ which I shall name dodecafluorocyclohexane or perfluorocyclohexane follows:

During a 14-hour period 36.9 grams of benzene vapor, 200 grams of fluorine and 333 grams of nitrogen were passed at uniform rates through the reaction vessel held at a temperature of approximately between 265° C. and 275° C. The products were then passed over solid potassium fluoride to remove hydrogen fluoride and the remaining fluorocarbons were then condensed. The condensed mixture was allowed to separate into a gaseous and liquid fraction at about 27° C. The latter material weighed 115.3 grams and of this 78% was found to be $C_6F_{12}$. When the temperature was reduced to below the optimum of between 265° C. to 275° C., for example to between 150° C. to 175° C., fairly good yields of fluorocarbon boiling above 75° C. up to 200° C. or more were obtained. This was due to the presence of polymers produced by the reaction.

The effect of temperature and excess fluorine was further tested using normal heptane. Fluorine flowing at a rate of 9 liters per hour, was mixed with nitrogen passing at a rate of 16 liters per hour, and the mixture was fed into the reaction vessel. Nitrogen passing at a rate of 11 liters per hour was mixed with normal heptane vapor passing at a rate of 2.5 grams per hour and the mixture was fed into the reaction vessel containing a silver fluoride catalyst. With the temperature of the reaction vessel maintained at about 130° C. approximately 5% by weight of the resulting product was $C_7F_{16}$, the remaining 95% consisted of fluorinated heptanes containing one to three hydrogen atoms per molecule. By limiting the supply of fluorine one may produce partially fluorinated compounds by this method.

Other experiments carried out using an excess of fluorine yielded the following:—When the temperature was kept at about 200° C. the yield of liquid fluorocarbon (mostly $C_7F_{16}$) was about 45% of the theoretical value. At about 150° C. the yield was 55% and at about 100° C. to 110° C. yields as high as 80% were obtained. Under the particular conditions of flow a temperature range between 120° C. and 140° C. gave the best consistent results. Catalysts other than silver fluoride on metallic copper may have different optimum temperatures for operation.

It has been noticed that the catalyst surface also affects optimum temperatures of operation. Under certain conditions a 200° C. temperature was found best, but when the surface area of the catalyst was increased nine times and the time of contact increased by one half, the optimum temperature for fluorination of normal heptane fell to about 100° C. to 120° C. If the catalyst near the gas outlet is maintained at a slightly higher temperature than that at the inlets, the reaction is aided somewhat in going to completion.

To eliminate incompletely fluorinated by-products to a great extent, the rates of flow of the hydrocarbons and fluorine should be so adjusted that an excess of the free halogen is present.

When a compound of high boiling point, such as a light lubricating oil, is used it is especially desirable to add a diluent gas in order that the fluorination may proceed in the vapor state at temperatures below the boiling point of the hydrocarbon. It is thus possible to fluorinate chrysene and other compounds boiling at 445° C. or more at about 300° C. or even less. The temperature must be high enough, however, to prevent the accumulation of a fluorocarbon tar within the reaction vessel.

The following is an illustrative example of the preparation of fluorocarbon oils:

A stream of fluorine flowing at a rate of about 50 liters per hour was passed in at one end of a reaction vessel. The vaporized lubricating oil, diluted by nitrogen, was carried into the reaction system at a rate almost sufficient to consume all of the fluorine. The halogen was allowed to mix with the stream of vaporized oil in the presence of a catalyst comprising silver fluorides suspended on copper turnings. The vessel, filled with the catalyst, was heated to a temperature close to 300° C. The gases flowing from the outlet were passed through a tube cooled to about 20° C., where the less volatile portion of the product condensed and was drawn off. Additional fluorocarbon, together with hydrogen fluoride was collected in a second condenser which was cooled by subliming carbon dioxide. The fluorocarbon phase was mechanically separated from the hydrogen fluoride and the two portions of fluorocarbon were combined. The liquid fluorocarbon was then refined by: (1) washing with dilute (about 10%) caustic soda solution, (2) washing with water, (3) drying with anhydrous potassium fluoride, (4) filtering, (5) distilling from an ordinary distilling flask under vacuum at 10 millimeters of mercury. The distillation yielded a variety of colorless products of increasing boiling point and viscosity. Cuts taken below 100° C. were very fluid at room temperature. Those taken between 100° C. and 200° C. were oily in texture and were of increasing viscosity. Those boiling between 200° and about 250° C. were very viscous and tacky materials at room temperature. The product boiling above 250° C. was brittle, with a texture similar to that of resin. All of the higher boiling materials became oils when heated sufficiently. Although the total yield of liquid fluorocarbon was about 60% of that theoretically expected from the oil used, the yield of any one narrow boiling cut was of course much smaller.

If one wishes to obtain a higher yield of a fluorocarbon product of any one narrow boiling range he may use a hydrocarbon which reacts to give the desired type of liquid. For example, condensed ring aromatic hydrocarbons such as naphthalene, anthracene or chrysene may be fluorinated to give products which in each case contain a high proportion of a saturated fluorocarbon of a narrow boiling range.

The large cut obtained upon the distillation of a fluorinated anthracene boils at about 215° C. at normal atmospheric pressure, while the main cut of the product from the fluorination of chrysene boils at about 140° C. at 10 mm. of mercury pressure. The former material is a wax and the latter is an oil at room temperature. Such fluorocarbons have been readily produced using illustrative preparation method and condensing system described hereinabove.

All of the fluorinations previously described in this application have been carried out in the presence of nitrogen as a diluent. We have also obtained satisfactory yields of the desired liquid fluorocarbons by mixing undiluted streams of fluorine and vaporized hydrocarbons in the presence of a catalyst. For example, isobutane and normal heptane were readily fluorinated in the system used for the fluorination of the oil, when the reaction vessel was held at temperatures between 140° C. and 200° C.

Instead of the semi-continuous method mentioned above a continuous apparatus for preparation of the fluorocarbons may be employed. Such an apparatus is shown in Fig. 2 in which the introduction of nitrogen gas into the hydrocarbon, from a source of unlimited supply, is controlled by a valve 11 affixed to pipe 4 and the replenishment of the hydrocarbon liquid in chamber 5 is made through pipe 12 controlled by valve 13. Valves 14 and 15 control the flow of nitrogen and fluorine gases through pipes 7 and 8 into the reaction vessel 1. The outlet 10 leads to a vessel 45 containing a reagent 16 such as water, sodium fluoride, potassium fluoride, sodium hydroxide, etc., which may be continuously introduced by feeding from end 17 and drawn off with hydrogen fluoride at end 18, both ends having removable stoppers 19. The fluorocarbons and other gases pass through tube 20 which leads into a cooling or condensing chamber 21 in which some of the liquid fluorinated hydrocarbons may be drawn off by tube 22. From the first cooling chamber some gases may be re-circulated through the system in which event they pass through pipe 23, pump 24, flow regulator 25, flow meter 26, and pipe 27 back into the reaction vessel. Other gases pass from the first condensing chamber through pipe 28 into a second condensing chamber 29, cool enough to condense nearly all of the fluorocarbon which is drawn off through pipe 30. Any gaseous fluorocarbons may be passed to further receivers (not shown).

The apparatus may be rearranged so that hydrogen fluoride and fluorocarbon are condensed together and are later separated by mechanical separation of the two liquids. The catalyst may be in several chambers, with the temperature slightly higher in each succeeding chamber. The use of a gaseous diluent is unnecessary, it being practical to feed only fluorine and hydrocarbon vapor. Any number of variations may be made and still incorporate the invention herein made, and thus it is appreciated that the scope is not to be limited by the forms shown in the drawings.

It has been found advantageous to use partially fluorinated hydrocarbons such as fluorinated hexane, difluoroheptane, or benzotrifluoride as the reacting material, instead of a pure hydrocarbon. This permits one to get more product from a given weight of fluorine.

Although it is preferable to carry out the process using the organic materials in a vapor state, the invention applies also to the fluorination of organic liquids which may be introduced as fine sprays or as streams of liquid which vaporize in the reaction vessel.

Throughout the above examples, it has been stated that the hydrocarbon and fluorine are introduced simultaneously. A variation upon this procedure which works satisfactorily is to add first fluorine, then hydrocarbon, then fluorine, then hydrocarbon, etc., the puffs being of such duration that a slight net excess of fluorine is used so that the hydrocarbon never reduces all of the active material in the catalyst. This action comprises alternate fluorinations of the catalyst and of the hydrocarbon.

The prefix "perfluoro," as applied to certain compounds in the appended claims, indicates that fluorine is substituted for each of the hydrogen atoms ordinarily present in said compound.

The present invention is not to be construed as limited to the reactions discussed or to the use of any specified pure or mixed hydrocarbon but only by the following claims.

I claim:

1. The method of producing a saturated fluorocarbon which comprises contacting the vapor of a hydrocarbon having more than two carbon atoms and excess gaseous fluorine in the presence of a catalyst comprising a heat conductive metal base having thereon an adherent layer of a metal fluoride selected from the group of the fluorides of silver, cobalt, manganese and cerium, maintaining the reactants at a temperature in the range of 100° C. to 400° C., and collecting a saturated fluorocarbon.

2. The method of producing a fluorocarbon which comprises diluting at least one of elemental fluorine and a hydrocarbon having more than two carbon atoms with an inert excess gaseous diluent, passing said fluorine and said hydrocarbon in the vapor phase over a catalyst comprising a heat conductive metal base having thereon an adherent layer of a metal fluoride selected from the group of the fluorides of silver, cobalt, manganese and cerium, maintaining the reactants at a temperature in the range of 100° C. to 400° C., and collecting a fluorocarbon.

3. The method of producing perfluoroheptane which comprises contacting heptane with excess elemental fluorine in the vapor phase in the presence of a catalyst comprising a heat conductive metal base having thereon an adherent layer of a metal fluoride selected from the group of the fluorides of silver, cobalt, manganese and cerium, maintaining the temperature of the reactants between 120° C. and 140° C., and collecting perfluoroheptane.

4. A method of producing a saturated fluorocarbon containing at least fourteen carbon atoms per molecule which comprises contacting the vapor of a saturated hydrocarbon having at least fourteen carbon atoms per molecule and excess gaseous fluorine in the presence of a catalyst comprising a heat conductive metal base having thereon an adherent layer of a metal fluoride selected from the group of the fluorides of silver, cobalt, manganese and cerium, and in the presence of an inert gaseous diluent, maintaining the reactants at a temperature in the range of 250° C. and 400° C., and collecting a saturated fluorocarbon.

5. A method of producing perfluoromethylcyclohexane which comprises contacting benzotrifluoride with excess elemental fluorine in the vapor phase in the presence of a catalyst comprising a heat conductive metal base having thereon an adherent layer of a metal fluoride selected from the group of the fluorides of silver, cobalt, manganese and cerium, and in the presence of an inert gaseous diluent, maintaining the reactants at a temperature in the range of 100° C. to 400° C. and collecting perfluoromethylcyclohexane.

6. A method of producing perfluorodimethylcyclohexane which comprises contacting xylene with excess elemental fluorine in the vapor phase in the presence of a catalyst comprising a heat conductive metal base having thereon an adherent layer of a metal fluoride selected from the group of the fluorides of silver, cobalt, manganese and cerium, and in the presence of an inert gaseous diluent, maintaining the reactants at a temperature in the range of 100° C. to 400° C., and collecting perfluorodimethylcyclohexane.

7. A method of producing perfluorotrimethylcyclohexane which comprises reacting mesitylene with excess elemental fluorine in the vapor phase in the presence of a catalyst comprising a heat conductive metal base having thereon an adherent layer of a metal fluoride selected from the group of the fluorides of silver, cobalt, manganese and cerium, and in the presence of an inert gaseous diluent, maintaining the reactants at a temperature in the range of 100° C. to 400° C. and collecting perfluorotrimethylcyclohexane.

GEORGE H. CADY.

REFERENCES CITED

The following references are of record in the file of this patent:

UNITED STATES PATENTS

| Number | Name | Date |
| --- | --- | --- |
| 2,013,030 | Calcott | Sept. 3, 1935 |
| 2,090,772 | Wiezevich | Aug. 24, 1937 |
| 2,129,289 | Soll | Sept. 6, 1938 |
| 2,186,916 | Wiezevich | Jan. 9, 1940 |
| 2,307,773 | Egloff | Jan. 12, 1943 |

FOREIGN PATENTS

| Number | Country | Date |
| --- | --- | --- |
| 214,293 | Great Britain | of 1924 |
| 786,123 | France | Aug. 27, 1935 |

OTHER REFERENCES

Simons et al., "Jour. Am. Chem. Soc.," vol. 59, page 1407 (1937).

Simons et al., "Jour. Am. Chem. Soc.," vol. 61, pages 2962–6 (1939).

Fukuhara et al., "J. Am. Chem. Soc.," vol. 63, pages 2792–5 (1941).

Henne et al., J. A. C. S., vol. 58, June 1936, pages 884–887.

Certificate of Correction

Patent No. 2,574,619                                        November 13, 1951

GEORGE H. CADY

It is hereby certified that error appears in the printed specification of the above numbered patent requiring correction as follows:

Column 7, line 2, strike out "excess"; line 3, after "fluorine" insert *in excess*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*